US009221969B2

(12) United States Patent
Kramer et al.

(10) Patent No.: US 9,221,969 B2
(45) Date of Patent: Dec. 29, 2015

(54) THERMALLY HARDENABLE EPOXY RESIN COMPOSITION HAVING AN IMPROVED IMPACT RESISTANCE AT LOW TEMPERATURES

(75) Inventors: Andreas Kramer, Zurich (CH); Jurgen Finter, Zurich (CH)

(73) Assignee: SIKA TECHNOLOGY AG, Baar (CH)

( * ) Notice: Subject to any disclaimer, the term of this patent is extended or adjusted under 35 U.S.C. 154(b) by 1589 days.

(21) Appl. No.: 10/538,877

(22) PCT Filed: Dec. 17, 2003

(86) PCT No.: PCT/EP03/14382
§ 371 (c)(1),
(2), (4) Date: Oct. 6, 2006

(87) PCT Pub. No.: WO2004/055092
PCT Pub. Date: Jul. 1, 2004

(65) Prior Publication Data
US 2007/0105983 A1    May 10, 2007

(51) Int. Cl.
C08L 63/00 (2006.01)
C08G 59/28 (2006.01)
C09J 163/00 (2006.01)

(52) U.S. Cl.
CPC ............... *C08L 63/00* (2013.01); *C08G 59/28* (2013.01); *C09J 163/00* (2013.01)

(58) Field of Classification Search
CPC ........................................................ C08L 63/00
USPC ................................................ 523/455, 400
See application file for complete search history.

(56) References Cited

U.S. PATENT DOCUMENTS

| | | |
|---|---|---|
| 3,148,167 A | 9/1964 | Keplinger, Jr. |
| 3,468,835 A | 9/1969 | Dereich |
| 3,505,283 A | 4/1970 | Dalhuisen |
| 3,533,983 A | 10/1970 | Hirosawa |
| 4,235,974 A | 11/1980 | Blount |
| 4,383,068 A | 5/1983 | Brandt |
| 4,401,776 A | 8/1983 | Munk |
| 4,486,556 A | 12/1984 | Kordomenos et al. |
| 4,749,728 A | 6/1988 | Craun et al. |
| 4,952,645 A | 8/1990 | Mulhaupt et al. |
| 5,073,601 A | 12/1991 | Mulhaupt et al. |
| 5,079,094 A | 1/1992 | Kimball |
| 5,151,327 A | 9/1992 | Nishiyama et al. |
| 5,166,229 A | 11/1992 | Nakano et al. |
| 5,189,081 A | 2/1993 | Akutagawa et al. |
| 5,274,006 A | 12/1993 | Kagoshima et al. |
| 5,278,257 A | 1/1994 | Mulhaupt et al. |
| 5,290,857 A | 3/1994 | Ashida et al. |
| 5,350,825 A | 9/1994 | Konig et al. |
| 5,411,768 A | 5/1995 | Knell et al. |
| 5,415,791 A | 5/1995 | Chou et al. |
| 5,484,853 A * | 1/1996 | Chen et al. ............... 525/454 |
| 5,668,227 A | 9/1997 | Wolleb et al. |
| 5,686,509 A | 11/1997 | Nakayama et al. |
| 5,707,439 A | 1/1998 | Takekoshi et al. |
| 5,908,911 A | 6/1999 | Nakashio et al. |
| 6,077,884 A | 6/2000 | Hess et al. |
| 6,153,709 A | 11/2000 | Xiao et al. |
| 6,197,849 B1 | 3/2001 | Zilg et al. |
| 6,207,733 B1 | 3/2001 | Feola et al. |
| 6,248,204 B1 | 6/2001 | Schupt |
| 6,322,890 B1 | 11/2001 | Barron et al. |
| 6,331,226 B1 | 12/2001 | Imashiro et al. |
| 6,451,927 B1 | 9/2002 | Haas et al. |
| 6,548,593 B2 | 4/2003 | Merz et al. |
| 6,649,706 B1 | 11/2003 | Heid et al. |
| 6,723,601 B2 | 4/2004 | Lee et al. |
| 6,723,803 B1 | 4/2004 | Hermansen et al. |
| 6,727,320 B2 | 4/2004 | Attarwala et al. |
| 6,740,192 B1 | 5/2004 | Lu et al. |
| 6,776,869 B1 | 8/2004 | Schenkel |
| 6,890,678 B2 | 5/2005 | Tanno |
| 6,903,180 B2 | 6/2005 | Kaji et al. |
| 6,903,182 B2 | 6/2005 | Fagan et al. |
| 8,062,468 B2 | 11/2011 | Finter et al. |
| 8,071,217 B2 | 12/2011 | Kramer et al. |

(Continued)

FOREIGN PATENT DOCUMENTS

| | | |
|---|---|---|
| CA | 1 334700 | 3/1995 |
| DE | 2123 033 | 8/1972 |

(Continued)

OTHER PUBLICATIONS

International Search Report for Application No. PCT/EP2007/061416; mailed Feb. 6, 2008.
Office Action for U.S. Appl. No. 12/311,046; mailed Nov. 2, 2009.
Restriction/Election of Species mailed Sep. 23, 2008 in U.S. Appl. No. 10/564,889.
Restriction/Election of Species mailed Feb. 2, 2009 in U.S. Appl. No. 10/564,889.
Office Action mailed Sep. 25, 2009 in U.S. Appl. No. 10/564,889.
International Search Report for Application No. PCT/EP2007/056598 mailed Aug. 29, 2007.
International Search Report for Application No. PCT/EP2006/063891; mailed Sep. 25, 2006.

(Continued)

*Primary Examiner* — Megan McCulley
(74) *Attorney, Agent, or Firm* — Oliff PLC

(57) ABSTRACT

The invention relates to compositions containing at least one epoxide adduct A that comprises an average of more than one epoxide group per molecule, at least one polymer B of formula (I), at least one thixotropic agent C based on a urea derivative in a non-diffusing carrier material, and at least one hardener D for epoxy resins, which is activated at an increased temperature. Said composition is used especially as an adhesive and is provided with an extraordinarily high impact peel working value, especially at low temperatures. The invention further relates to epoxide group-terminal impact strength modifiers of formula (I), which significantly increase the impact resistance in epoxy resin compositions, particularly two-component epoxy resin compositions.

28 Claims, No Drawings

(56) References Cited

U.S. PATENT DOCUMENTS

| | | | |
|---|---|---|---|
| 8,076,424 | B2 | 12/2011 | Kramer et al. |
| 2002/0007003 | A1 | 1/2002 | Merz et al. |
| 2002/0061970 | A1 | 5/2002 | Sawada |
| 2002/0176046 | A1 | 11/2002 | Kitamura et al. |
| 2003/0105266 | A1* | 6/2003 | Suga .............................. 528/45 |
| 2005/0143496 | A1 | 6/2005 | Mueller |
| 2005/0159511 | A1 | 7/2005 | Kramer |
| 2005/0209401 | A1 | 9/2005 | Lutz et al. |
| 2007/0066721 | A1 | 3/2007 | Kramer et al. |
| 2007/0105983 | A1 | 5/2007 | Kramer et al. |
| 2007/0241303 | A1 | 10/2007 | Zhong et al. |
| 2008/0073029 | A1 | 3/2008 | Kramer |
| 2009/0264558 | A1 | 10/2009 | Kramer et al. |
| 2009/0288766 | A1 | 11/2009 | Kramer et al. |
| 2009/0324958 | A1 | 12/2009 | Schulenburg et al. |
| 2010/0003506 | A1 | 1/2010 | Desai et al. |
| 2010/0009196 | A1 | 1/2010 | Kramer et al. |
| 2010/0273005 | A1 | 10/2010 | Kramer et al. |

FOREIGN PATENT DOCUMENTS

| | | |
|---|---|---|
| DE | 197 51 143 A | 5/1998 |
| DE | 198 58 921 | 6/2000 |
| DE | 199 24 170 A1 | 11/2000 |
| EP | 0 307 666 A1 | 3/1989 |
| EP | 0 338 985 B1 | 10/1989 |
| EP | 0 338 995 | 10/1989 |
| EP | 0 343 676 A | 11/1989 |
| EP | 0 343 686 A1 | 11/1989 |
| EP | 0 353 190 | 1/1990 |
| EP | 0 600 314 A1 | 6/1994 |
| EP | 0 781 790 A1 | 7/1997 |
| EP | 1 152 019 A1 | 11/2001 |
| EP | 1 359 202 A1 | 11/2003 |
| EP | 1 431 325 A1 | 6/2004 |
| EP | 1 498 441 A1 | 1/2005 |
| GB | 1 326 669 | 8/1973 |
| GB | 2 314 085 A | 12/1997 |
| JP | A-06-287411 | 10/1994 |
| JP | A-2000-212504 | 8/2000 |
| JP | A-2011-032417 | 2/2001 |
| WO | WO 00/37520 A1 | 6/2000 |
| WO | WO 00/37554 A1 | 6/2000 |
| WO | WO 01/23466 A1 | 4/2001 |
| WO | WO 01/94492 A1 | 12/2001 |
| WO | WO 02 48235 | 6/2002 |
| WO | WO 03/093387 A1 | 11/2003 |
| WO | WO 2004/055092 A1 | 7/2004 |
| WO | WO 2005/007720 A1 | 1/2005 |
| WO | WO 2005/007766 A1 | 1/2005 |

OTHER PUBLICATIONS

Office Action mailed Nov. 3, 2009 in U.S. Appl. No. 11/976,991.
Office Action for U.S. Appl. No. 10/564,889; mailed Apr. 14, 2010.
Sep. 21, 2010 Office Action issued in U.S. Appl. No. 10/564,889.
Feb. 8, 2011 Office Action issued in U.S. Appl. No. 10/564,889.
Office Action issued in U.S. Appl. No. 11/988,290, notification date of Dec. 28, 2010.
Chemical Book, 629-54-9 (Hexadecanamide) Product Description, 2007, two pages.
Office Action dated Jun. 2, 2014 issued in U.S. Appl. No. 12/864,104.
Office Action dated Nov. 14, 2013 issued in U.S. Appl. No. 12/864,104.
Product Information Sheet, "Supplying a Multitude of Products for Measurable Results," Dow Polyurethanes, Apr. 2011, 6 pages.
Product Information Sheet, Voranol CP 4755, Dow Chemical, 2013, one page.
Luvotix® HT, Lehmann & Voss & Co., 23513003-3, http://www.tecmos.com/carga/empresas/archivos/c10c5e57eb0d110f088931b4f76afa0d.pdf, pp. 1-4, available Apr. 2, 2013.
Apr. 2, 2013 Notification of Reasons for Refusal issued in Japanese Application No. 2010-544719 (with translation).
May 17, 2013 Office Action issued in U.S. Appl. No. 12/864,104.
Chemtura, Kenamide S Material Safety Data Sheet, issued Jan. 8, 2006, pp. 1 and 4.
King Industries, Disparlon 6500 Product Data Sheet, issued Sep. 2002, two pages.
Sep. 28, 2010 International Preliminary Report on Patentability issued in International Application No. PCT/EP2009/051084.
Mar. 13, 2009 International Search Report issued in International Application No. PCT/EP2009/051084. (with translation).
Nov. 2, 2012 Office Action issued in U.S. Appl. No. 12/864,104.
U.S. Appl. No. 12/864,104 in the name of Hofstetter et al., filed Jul. 22, 2010.
Wypych, George (2000). Handbook of Fillers—A Definitive User's Guide and databook (2nd Edition). ChemTec Publishing. Online version available at: http://www.knovel.com/web/portal/browse/display?_EXT_KNOVEL_DISPLAY_bookid=1011&VerticalID=0.
Jun. 27, 2011 Notice of Allowance issued in U.S. Appl. No. 11/988,290.
Aug. 10, 2011 Notice of Allowance issued in U.S. Appl. No. 10/564,889.
Derwent accession No. 2001-062546 for German Patent No. 19,924,170 and U.S. Pat. No. 6,649,706, Heid et al., Apr. 26, 2007, one page.
Derwent accession No. 2002-124066 for European Patent No. 1/152,019 and U.S. Pat. No. 6,548,593, Merz et al., Apr. 26, 2007, one page.
Apr. 7, 2004 International Search Report issued in International Patent Application No. PCT/EP/03/14382.
Feb. 2, 2009 Office Action issued in U.S. Appl. No. 10/564,889.
Apr. 26, 2012 Office Action issued in U.S. Appl. No. 12/308,943.
U.S. Appl. No. 12/308,943 in the name of Schulenburg et al., filed Dec. 30, 2008.
Sep. 25, 2006 International Search Report issued in International Patent Application No. PCT/EP2006/063891 (with translation).
Aug. 7, 2009 Restriction/Election issued in U.S. Appl. No. 11/976,991.
Jul. 22, 2002 European Search Report issued in European Patent Application No. EP 02 00 9923.
May 18, 2010 Office Action issued in U.S. Appl. No. 12/311,046.
Mar. 19, 2010 Notice of Allowance issued in U.S. Appl. No. 11/976,991.
Sep. 22, 2011 Notice of Allowance issued in U.S. Appl. No. 11/988,290.
Sep. 9, 2011 Notice of Allowance issued in U.S. Appl. No. 11/988,290.
Jul. 23, 2012 Restriction/Election of Species issued in U.S. Appl. No. 12/864,104.
Sep. 21, 2011 Restriction/Election of Species issued in U.S. Appl. No. 12/308,943.
Office Action dated Mar. 6, 2014 issued in U.S. Appl. No. 12/308,943.
Feb. 5, 2015 Office Action issued in U.S. Appl. No. 12/864,104.
Dow product Information sheet for D.E.R. 671 Solid Epoxy Resin, Apr. 30, 1992, three pages.
Aug. 19, 2015 Office Action issued in U.S. Appl. No. 12/864,104.

* cited by examiner

THERMALLY HARDENABLE EPOXY RESIN COMPOSITION HAVING AN IMPROVED IMPACT RESISTANCE AT LOW TEMPERATURES

FIELD OF THE INVENTION

The invention relates to thermally hardenable compositions which simultaneously have a high impact resistance and good mechanical properties at low temperatures down to −40° C. and in particular can be used as one-component adhesives, and impact modifiers for epoxy resins at low temperatures.

DESCRIPTION OF THE PRIOR ART

In the manufacture both of vehicles and add-on parts and of machines and devices, high-quality adhesives are being used with increasing frequency instead of or in combination with conventional joining methods, such as screwing, riveting, punching or welding. This gives rise to advantages and new possibilities in manufacture, for example for the manufacture of composite and hybrid materials, or greater latitudes in the design of components. For an application in vehicle production, the adhesives must have good adhesion to all substrates used, in particular electrolytically galvanized, hot-galvanized and subsequently phosphated steel sheets, oiled steel sheets and various, optionally surface-treated, aluminum alloys. These good adhesion properties must in particular also be retained after aging (climatic cycling, salt spray bath, etc.) without major deteriorations in quality. If the adhesives are used as body-shell adhesives in automotive construction, the resistance of these adhesives to cleaning baths and dip coating (so-called wash-out resistance) is of major importance for enabling the manufacturer's process reliability to be guaranteed.

The adhesives for body-shell construction must harden under the customary baking conditions of, ideally, 30 min at 180° C. However, they must furthermore also be resistant up to about 220° C. Further requirements for such a hardened adhesive or of the adhesive bond are the guarantee of operational safety both at high temperatures up to about 90° C. and at low temperatures down to about −40° C. Since these adhesives are structural adhesives, and these adhesives therefore adhesively bond structural parts, high strength and impact resistance of the adhesive are of very great importance.

It is true that conventional epoxy adhesives are distinguished by high mechanical strength, in particular high tensile strength. When the adhesive bond is subjected to stress by impact, however, classical epoxy adhesives are generally too brittle and therefore are far from able to meet the requirements, in particular in the automotive industry, under crash conditions under which both great tensile stresses and cleavage stresses occur. In particular, the strengths at high temperatures but in particular at low temperatures (<−10° C.) are often insufficient in this context.

The literature proposes substantially two methods for enabling the brittleness of epoxy adhesives to be reduced and hence the impact resistance to be increased: firstly, the aim can be achieved by the admixing of at least partly crosslinked high molecular weight compounds, such as latices of core/shell polymers or other flexibilizing polymers and copolymers. Secondly, a certain increase in toughness can also be achieved by introducing flexible segments, for example by the corresponding modification of the epoxide components.

According to the first-mentioned technique corresponding to the teaching in the U.S. Pat. No. 5,290,857, epoxy resins can be made more impact resistant by mixing a fine, pulverulent core/shell polymer into the epoxide matrix. This gives rise to highly resilient domains in the rigid brittle epoxide matrix which increase the impact strength. Such core/shell polymers are described in U.S. Pat. No. 5,290,857 and are based on acrylate or methacrylate polymers.

According to the second-mentioned technique, U.S. Pat. No. 4,952,645 describes epoxy resin compositions which were flexibilized by the reaction with aliphatic, cycloaliphatic or aromatic carboxylic acids, in particular di- or trimeric fatty acids, and with carboxylic acid-terminated aliphatic or cycloaliphatic diols. Such compositions should be distinguished by increased flexibility, in particular at low temperatures.

EP 0 343 676 describes a reactive hotmelt epoxy adhesive comprising a polyurethane-epoxide adduct. The terminal isocyanate groups of prepolymers are reacted with at least one epoxy resin containing hydroxyl groups and having an OH functionality greater than 2, so that a hotmelt adhesive solid at room temperature is obtained.

It is also known that epoxy resins can be flexibilized with elastomers, such as synthetic rubbers and derivatives thereof. The main effect in relation to the imparting of tough and resilient properties is based on the only partial miscibility of the epoxy resins and the corresponding derivatized synthetic rubbers, with the result that heterodisperse phases which have an effect comparable to the core/shell polymers form in the production process. However, the establishment of this superstructure is very dependent both on the quantitative composition and on the procedure during the hardening process. The result of this is that a continuously constant quality is very difficult to achieve.

SUMMARY OF THE INVENTION

It is the object of the present invention to provide novel impact modifiers for epoxy resin compositions, which impact modifiers are suitable in particular for use at low temperatures. These impact modifiers should preferably be suitable as a component of one-component and thermally hardening compositions which are stable at room temperature, in particular adhesives and hotmelt adhesives.

Surprisingly, it was found that this can be achieved by using polymeric compounds terminated with epoxide groups and of the general formula (I):

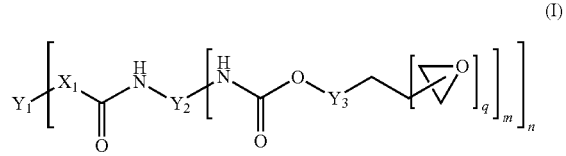

in which $X_1$ is O, S or NH;

$Y_1$ is an n-valent radical of a reactive polymer after removal of the terminal amino, thiol or hydroxyl groups;

$Y_2$ is a divalent radical of aliphatic, cycloaliphatic, aromatic or araliphatic diisocyanates after removal of the isocyanate groups or is a trivalent radical of trimers or biurets of aliphatic, cycloaliphatic, aromatic or araliphatic diisocyanates after removal of the isocyanate groups;

$Y_3$ is a radical of an aliphatic, cycloaliphatic, aromatic or araliphatic epoxide containing a primary or secondary hydroxyl group after removal of the hydroxide and epoxide groups;

and q is 1, 2 or 3; m is 1 or 2 and n is 2, 3 or 4.

It has been found that this polymer of the formula (I) is a good impact modifier.

A particular aspect of the invention relates to a composition which comprises at least one epoxide adduct A having on average more than one epoxide group per molecule and at least one polymer B of the formula (I) and at least one thixotropic agent C, based on a urea derivative in a non-diffusing carrier material, and at least one hardening agent D for epoxy resins, which is activated by elevated temperature. This composition serves in particular as an adhesive and has an extremely high dynamic resistance to cleavage, in particular at low temperatures.

According to preferred embodiments, compositions which additionally contain at least one filler E and/or at least one reactive diluent F are furthermore described.

The invention furthermore relates to impact modifiers terminated with epoxide groups and of the formula (I). It has been found that these novel impact modifiers result in a significant increase in impact resistance in epoxy resin compositions, in particular 1-component thermally hardening epoxy resin compositions and in 2-component epoxy resin compositions.

DESCRIPTION OF THE PREFERRED EMBODIMENTS

The present invention relates to compositions which contain at least one epoxide adduct A having on average more than one epoxide group per molecule, at least one polymer B of the formula (I), at least one thixotropic agent C, based on a urea derivative in a non-diffusing carrier material, and at least one hardening agent D for epoxy resins, which is activated by elevated temperature.

The epoxide adduct A is an epoxide adduct A1 or an epoxide adduct A2.

The epoxide adduct A1 is obtainable from the reaction of at least one dicarboxylic acid and at least one diglycidyl ether. The epoxide adduct A2 is obtainable from the reaction of at least one bis(aminophenyl) sulfone isomer or of at least one aromatic alcohol and at least one diglycidyl ether.

The dicarboxylic acid used for the preparation of the epoxide adduct A1 is preferably a dimeric fatty acid. Dimeric $C_4$-$C_{20}$ fatty acids which are $C_8$-$C_{40}$ dicarboxylic acids have proven to be particularly suitable.

The diglycidyl ethers are preferably a liquid resin, in particular the diglycidyl ether of bisphenol A (DGEBA), of bisphenol F and of bisphenol A/F (the designation "A/F" refers here to a mixture of acetone with formaldehyde, which is used as a starting material in the preparation thereof). Owing to the processes for the preparation of these resins, it is clear that the liquid resins also contain higher molecular weight components. Such liquid resins are obtainable, for example, as Araldite GY 250, Araldite PY 304, Araldit GY 282 (Vantico) or D.E.R 331 (Dow).

The epoxide adduct A1 has a flexibilizing character.

The epoxide adduct A2 is obtainable by the reaction of at least one bis(aminophenyl) sulfone isomer or at least one aromatic alcohol with at least one diglycidyl ether. The aromatic alcohol is preferably selected from the group consisting of 2,2-bis(4-hydroxyphenyl)propane (=bisphenol A), bis(4-hydroxyphenyl)methane (=bisphenol F), bis(4-hydroxyphenyl) sulfone, hydroquinone, resorcinol, pyrocatechol, naphthoquinone, naphthoresorcinol, dihydroxynaphthalene, dihydroxyanthraquinone, dihydroxybiphenyl, 3,3-bis(p-hydroxyphenyl)phthalides, 5,5-bis(4-hydroxyphenyl)-hexahydro-4,7-methanoindane and all isomers of the abovementioned compounds. Bis(4-hydroxyphenyl)sulfone is suitable as a particularly preferred aromatic alcohol.

The preferred bis(aminophenyl) sulfone isomers are bis (4,-aminophenyl) sulfone and bis(3-aminophenyl) sulfone.

The preferred diglycidyl ethers are the diglycidyl ethers already described for epoxide adduct A1.

The epoxide adduct A2 tends to have a rigid structure.

The simultaneous presence of epoxide adduct A1 and epoxide adduct A2 in compositions as claimed in claim 1 is particularly preferred.

The epoxide adduct A preferably has a molecular weight of 700-6000 g/mol, preferably 900-4000 g/mol, in particular 1000-3300 g/mol. Here and below, "molecular weight" is understood as meaning the average molecular weight Mn.

The preparation of the epoxide adduct A is effected in the manner known to the person skilled in the art. Advantageously, an additional amount of the diglycidyl ether or diglycidyl ethers used for adduct formation is added at the end of the adduct formation and used as epoxide adduct A premix. In this epoxide adduct A premix, the total proportion of the unreacted diglycidyl ether or diglycidyl ethers is 12-50% by weight, preferably 17-45% by weight, based on the total weight of the epoxide adduct A premix.

Here and below, "total proportion" is understood in each case as meaning the sum of all components belonging to this category. If, for example, two different diglycidyl ethers occur simultaneously in the adduct formation, the total proportion of the diglycidyl ether is to be understood as meaning the sum of these two diglycidyl ethers.

Furthermore, the proportion by weight of the epoxide adduct A premix is advantageously 20-70% by weight, preferably 35-65% by weight, based on the weight of the total composition.

The polymer B can be represented by the formula (I)

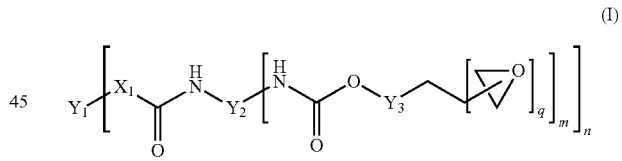

Here, $X_1$ is O, S or NH. $Y_1$ is an n-valent radical of a reactive polymer after removal of the terminal amino, thiol or hydroxyl groups. $Y_2$ is a divalent radical of aliphatic, cycloaliphatic, aromatic or araliphatic diisocyanates after removal of the isocyanate groups or is a trivalent radical of trimers or biurets of aliphatic, cycloaliphatic, aromatic or araliphatic diisocyanates after removal of the isocyanate groups. $Y_3$ is a radical of an aliphatic, cycloaliphatic, aromatic or araliphatic epoxide containing a primary or secondary hydroxyl group after removal of the hydroxide and epoxide groups.

The values q=1, 2 or 3 apply to the indices q, and the values m=1 or 2 apply to m, while the values n=2, 3 or 4 apply to n.

The polymer B of the formula (I) is obtainable, for example, by reacting isocyanate-terminated prepolymers of the formula (II) with monohydroxy-epoxide compounds of the formula (III) according to the reaction RS1:

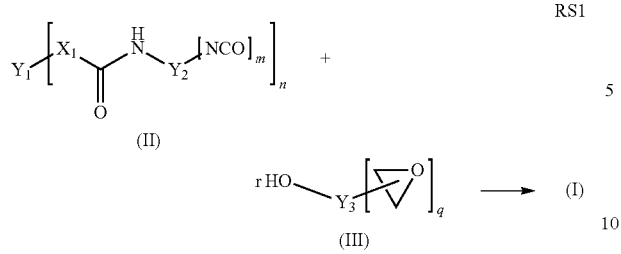

(II)

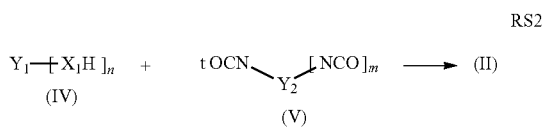

(I)

The isocyanate-terminated prepolymers of the formula (II) which are used are the reaction product of polyisocyanates of the formula (V) and compounds of the formula (IV) which carry $X_1H$ groups according to the reaction RS2:

$$Y_1\text{---}[X_1H]_n + tOCN\text{---}Y_2\text{---}[NCO]_m \longrightarrow (II)$$
(IV)   (V)   RS2

The polymers of the formula (IV) have groups $X_1H$. These may be, independently of one another, OH, SH or $NH_2$. The hydroxyl group is preferred.

Preferred compounds of the formula (IV) are polyols, for example the following commercially available polyols or any desired mixtures thereof:

polyoxyalkylenepolyols, also referred to as polyetherpolyols, which are the polymerization product of ethylene oxide, 1,2-propylene oxide, 1,2- or 2,3-butylene oxide, tetrahydrofuran or mixtures thereof, optionally polymerized with the aid of an initiator molecule having two or three active H atoms, such as, for example, water or compounds having two or three OH groups. Both polyoxyalkylenepolyols which have a low degree of unsaturation (measured according to ASTM D 2849 69 and stated in milliequivalent of unsaturation per gram of polyol (meq/g)), prepared, for example, with the aid of so-called double metal cyanide complex catalysts (DMC catalysts for short) and polyoxyalkylenepolyols having a higher degree of unsaturation, prepared, for example, with the aid of anionic catalysts, such as NaOH, KOH or alkali metal alcoholates, may be used. Polyoxypropylenediols and triols having a degree of unsaturation of less than 0.02 meq/g and having a molecular weight in the range of 1000-30 000 g/mol, polyoxybutylenediols and triols, polyoxypropylenediols and triols having a molecular weight of 400-8000 g/mol and so-called "EO-endcapped" (ethylene oxide-endcapped) polyoxypropylenediols or triols are especially suitable. The latter are special polyoxypropylene-polyoxyethylenepolyols which are obtained, for example, by alkoxylating pure polyoxypropylenepolyols with ethylene oxide after the end of the polypropoxylation and thus have primary hydroxyl groups;

polyhydroxyl-terminated polybutadienes;

polyesterpolyols prepared, for example, from dihydric or trihydric alcohols, such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the abovementioned alcohols with organic dicarboxylic acids or anhydrides or esters thereof, such as, for example, succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid or mixtures of the abovementioned acids, and polyesterpolyols obtained from lactones, such as, for example, E-caprolactone;

polycarbonatepolyols as obtainable by reaction of, for example, the abovementioned alcohols-used for the synthesis of the polyesterpolyols-with dialkyl carbonates, diaryl carbonates or phosgene.

The polymers of the formula (IV) are advantageously difunctional or higher functional polyols having OH equivalent weights of from. 600 to 6000 g/OH equivalent, preferably from 700 to 2200 g/OH equivalent. The polyols are furthermore advantageously selected from the group consisting of polyethylene glycols, polypropylene glycols, polyethylene glycol/polypropylene glycol block polymers, polybutylene glycols, hydroxyl-terminated polybutadiene, hydroxyl-terminated polybutadiene-co-acrylonitrile, hydroxyl-terminated synthetic rubbers and mixtures of these stated polyols.

Furthermore, with difunctional or higher functional amine-terminated polyethylene ethers, polypropylene ethers, polybutylene ethers, polybutadienes, polybutadiene/acrylonitriles and further amine-terminated synthetic rubbers or mixtures of said components may also be used as polymers of the formula (IV).

α,ω-Polyalkylene glycol having $C_2$-$C_6$-alkylene groups or having mixed $C_2$-$C_6$-alkylene groups, which are terminated with amino, thiol or, preferably, hydroxyl groups, are particularly preferred as polymers of the formula (IV). Polyoxybutylenes terminated with hydroxyl groups are particularly preferred.

The polyisocyanates of the formula (V) are diisocyanates or triisocyanates. Suitable diisocyanates are aliphatic, cycloaliphatic, aromatic or araliphatic diisocyanates, in particular commercially available products, such as methylenediphenyl diisocyanate (MDI), hexamethylene diisocyanate (HDI), toluene diisocyanate (TDI), tolidene diisocyanate (TODI), isophorone diisocyanate (IBDI), trimethylhexamethylene diisocyanate (TMDI), 2,5- or 2,6-bis(isocyanatomethyl)-bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), etc., and the dimers thereof. HDI, IPDI, MDI or TDI are preferred. Suitable triisocyanates are trimers or biurets of aliphatic, cycloaliphatic, aromatic or araliphatic diisocyanates, in particular the isocyanurates and biurets of the diisocyanates described in the preceding paragraph.

A further possibility for $Y_1$ comprises chain-extended radicals of molecules after removal of the $X_1H$ groups, which are formally obtainable by a reaction similar to equation RS2 between the di- and triols and/or di- or triamines already mentioned above and the di- or triisocyanates already mentioned. By varying t equation RS2, or the stoichiometry, there are two possibilities for this.

Firstly, OH-functional polymers having chains of different lengths can be obtained by means of an excess of the $X_1H$ groups, based on the NCO groups. Such chain-extended polyols or polyamines of the formula (IV) contain urethane or urea groups in the chain and can be further reacted with other di- or triisocyanates so that polymers of the formula (II) form.

Secondly, NCO-functional polymers of the formula (II) having chains of different lengths can be obtained by means of an excess of the $X_1H$ groups, based on the NCO groups.

The chain length and degree of crosslinking of these chain-extended polymers of the formula (II) are very dependent on the ratio [X₁H]/[NCO]. The chains are the longer the more closely this ratio approaches 1. It is clear to the person skilled in the art that chains which are too long or a degree of crosslinking which is too high would lead to polymers which are no longer usable.

Diols or diamines and diisocyanates are particularly preferred for the chain extension. The monohydroxy-epoxide compound of the formula (II) has 1, 2 or 3 epoxide groups. The hydroxide group of this monohydroxy-epoxide compound (II) may be a primary or a secondary hydroxyl group.

Corresponding amounts of monohydroxyl-containing epoxides of the formula (III) can be used for the reaction of the terminal isocyanates thus obtained. However, it is possible to depart from the stoichiometry which is given in equation RS1 by r=m·n, corresponding to a ratio [OH]/[NCO]=1. The ratio [OH]/[NCO] is from 0.6 to 3.0, preferably from 0.9 to 1.5, in particular from 0.98 to 1.1.

Depending on the reaction procedure, the corresponding monohydroxy-epoxide compounds are also formed as byproducts in different concentrations in the reaction of polyfunctional alcohols with epichlorohydrin. Said monohydroxy-epoxide compounds can be isolated by customary separation operations. As a rule, however, it is sufficient to use the product mixture obtained in the glycidylation reaction of polyols and comprising polyol completely and partly reacted to give the glycidyl ether. Examples of such hydroxyl-containing epoxides are trimethylolpropanediglycidyl ether (contained as a mixture in trimethylolpropanetriglycidyl ether), gyceryldiglycidyl ether (contained as a mixture in glyceryltriglycidyl ether), pentaerythrityltriglycidyl ether (contained as a mixture in pentaerythrityltetraglycidyl ether). Trimethylolpropanediglycidyl ether, which occurs in relatively high proportions in customarily prepared trimethylolpropanetriglycidyl ether, is preferably used.

However, it is also possible to use other similar hydroxyl-containing epoxides, in particular glycidol, 3-glycidyloxybenzyl alcohol or hydroxymethylcyclohexene oxide. The β-hydroxyether of the formula (VI), which is contained in an amount of about 15% in commercially available liquid epoxy resins prepared from bisphenol A (R=CH₃) and epichlorohydrin, and the corresponding β-hydroxyethers which are formed in the reaction of bisphenol F (R=H) or of the mixture of bisphenol A and bisphenol F with epichlorohydrin, are furthermore preferred.

The polymer B can, if required and depending on the resulting viscosity, be diluted with further epoxy resins. Diglycidyl ethers of bisphenol A, bisphenol F and bisphenol A/F, but also the reactive diluents F described further below and containing epoxide groups, in particular hexanediol glycidyl ether, polypropylene glycol diglycidyl ether and trimethylolpropane triglycidyl ether, are preferred for this purpose. The total proportion of the polymer B is advantageously 5-40% by weight, preferably 7-30% by weight, based on the weight of the total composition.

The composition furthermore contains at least one thixotropic agent C based on a urea derivative in a non-diffusing carrier material. The preparation of such urea derivatives and carrier materials are described in detail in the Patent Application EP 1 152 019 A1. The carrier material is advantageously a block polyurethane prepolymer C1, in particular obtained by reaction of a trifunctional polyetherpolyol with IPDI and subsequent blocking of the terminal isocyanate groups with caprolactam.

The urea derivative is a reaction product of an aromatic monomeric diisocyanate with an aliphatic amine compound. It is also entirely possible to react a plurality of different monomeric diisocyanates with one or more aliphatic amine compounds or a monomeric diisocyanate with a plurality of aliphatic amine compounds. The reaction product of 4,4'-diphenylmethylene diisocyanate (MDI) with butylamine has proven to be particularly advantageous.

The total proportion of the thixotropic agent C is advantageously 5-40% by weight, preferably 10-25% by weight, based on the weight of the total composition. The proportion of the urea derivative is advantageously 5-50% by weight, preferably 15-30% by weight, based on the weight of the thixotropic agent C.

The composition according to the invention furthermore contains at least one hardening agent D for epoxy resins, which is activated by elevated temperature. This is preferably a hardening agent which is selected from the group consisting of dicyandiamide, guanamines, guanidines, aminoguanidines and derivatives thereof. Catalytically active substituted ureas, such as 3-chloro-4-methylphenylurea (chlortoluron) or phenylmethylureas, in particular p-chlorophenyl-N,N-dimethylurea (monuron), 3-phenyl-1,1-dimethylurea (fenuron) or 3,4-dichlorophenyl-N,N-dimethylurea (diuron), are furthermore possible. Compounds of the class consisting of the

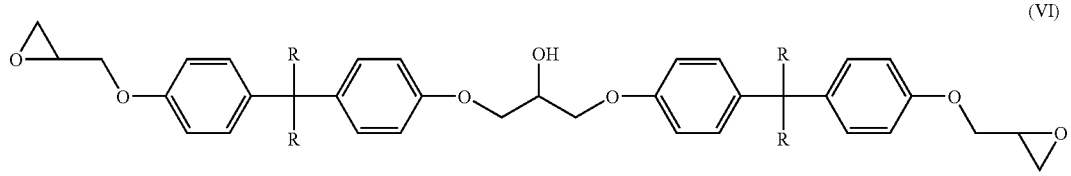

(VI)

Furthermore, very different epoxides having a β-hydroxyether group, prepared by the reaction of (poly)epoxides with less than the stoichiometric amount of a monofunctional nucleophile, such as carboxylic acids, phenols, thiols or sec-amines, can also be used.

The free primary or secondary OH functionality of the monohydroxy-epoxide compound of the formula (III) permits an efficient reaction with terminal isocyanate groups of prepolymers without disproportionate excess amounts of the epoxide components having to be used for this purpose.

The polymer B advantageously has a resilient character and is furthermore advantageously soluble or dispersible in epoxy resins.

imidazoles and amine complexes may furthermore be used. Dicyandiamide is particularly preferred.

The total proportion of the hardening agent D is advantageously 1-10% by weight, preferably 2-8% by weight, based on the weight of the total composition.

In a preferred embodiment, the composition additionally contains at least one filler E. This is preferably mica, talc, kaolin, wollastonite, feldspar, chlorite, bentonite, montmorillonite, calcium carbonate (precipitated or ground), dolomite, quartz, silicas (pyrogenic or precipitated), cristobalite, calcium oxide, aluminum hydroxide, magnesium oxide, hollow ceramic balls, hollow glass balls, hollow organic balls, glass balls or colored pigments. Both the organically coated and the uncoated commercially available forms known to the person skilled in the art are meant by filler E.

The total proportion of the total filler E is advantageously 5-30% by weight, preferably 10-20% by weight, based on the weight of the total composition.

In a further preferred embodiment, the composition additionally contains at least one reactive diluent F carrying epoxide groups. These reactive diluents F are in particular:

glycidyl ethers of monofunctional saturated or unsaturated, branched or straight-chain, cyclic or open-chain $C_4$-$C_{30}$ alcohols, e.g. butanol glycidyl ether, hexanol glycidyl ether, 2-ethylhexanol ether, allyl glycidyl ether, tetrahydrofurfuryl and furfuryl glycidyl ether, trimethoxysilyl glycidyl ether, etc.

glycidyl ethers of difunctional saturated or unsaturated, branched or straight-chain, cyclic or open-chain $C_2$-$C_{30}$ alcohols, e.g. ethylene glycol glycidyl ether, butanediol glycidyl ether, hexanediol glycidyl ether, octanediol glycidyl ether, cyclohexanedimethanol diglycidyl ether, neopentylglycol diglycidyl ether, etc.

glycidyl ethers of tri- or polyfunctional, saturated or unsaturated, branched or straight-chain, cyclic or open-chain alcohols, such as epoxidized castor oil, epoxidized trimethylolpropane, epoxidized pentaerythritol or polyglycidyl ether of aliphatic polyols, such as sorbitol, glycerol, trimethylolpropane, etc.

glycidyl ethers of phenol and aniline compounds, such as phenyl glycidyl ether, cresol glycidyl ether, p-tert-butylphenyl glycidyl ether, nonylphenol glycidyl ether, 3-n-pentadecenyl glycidyl ether (from cashew nut shell oil), N,N-diglycidylaniline, etc.

epoxidized tertiary amines, such as N,N-diglycidylcyclohexylamine, etc.

epoxidized mono- or dicarboxylic acids, such as glycidyl neodecanoate, glycidyl methacrylate, glycidyl benzoate, diglycidyl phthalate, tetrahydrophthalate and hexahydrophthalate, diglycidyl esters of dimeric fatty acids, etc.

epoxidized di- or trifunctional, low molecular weight to high molecular weight polyetherpolyols, such as polyethylene glycol diglycidyl ether, polypropylene glycol diglycidyl ether, etc.

Hexanediol diglycidyl ether, polypropylene glycol diglycidyl ether and polyethylene glycol diglycidyl ether are particularly preferred.

The total proportion of the reactive diluent F carrying epoxide groups is advantageously 1-7% by weight, preferably 2-6% by weight, based on the weight of the total composition.

It has been found that the composition according to the invention are at least successfully suitable as one-component adhesives. In particular, thermally hardening one-component adhesives which are distinguished by a high impact resistance both at relatively high temperatures and especially at low temperatures, in particular from 0° C. to −40° C., can be realized therewith. Such adhesives are required for the adhesive bonding of heat-stable materials. Heat-stable materials are understood as meaning materials which are dimensionally stable at a hardening temperature of 100 -220° C., preferably 120-200° C., at least during the hardening time. These are in particular metals and plastics, such as ABS, polyamide, polyphenylene ether, composite materials, such as SMC, unsaturated polyester glass fiber-reinforced plastics, composite epoxide or acrylate materials. The use in which at least one material is a metal is preferred. The adhesive bonding of identical or different metals, in particular in body-shell construction in the automotive industry, is considered to be a particularly preferred use. The preferred metals are especially steel, in particular electrolytically galvanized, hot-galvanized, oiled steel, bonazinc-coated steel, and subsequently phosphated steel, and aluminum, in particular in the variants typically occurring in automotive construction.

In particular, the desired combination of high crash strength and high and low temperature of use can be achieved with an adhesive based on a composition according to the invention.

Such an adhesive is first brought into contact at a temperature of 10° C. to 80° C., in particular from 10° C. to 60° C., with the materials to be adhesively bonded and then hardened, typically at a temperature of 100-220° C., preferably 120-200° C.

Of course, in addition to thermally hardening adhesives, sealing compounds or coatings can also be realized with a composition according to the invention. Furthermore, the compositions according to the invention are suitable not only for automotive construction but also for other fields of use. Particularly obvious are related applications in construction of means of transport, such as ships, trucks, buses or railway vehicles, or in the construction of consumer goods, such as, for example, washing machines.

The materials adhesively bonded by means of a composition according to the invention are used at temperatures of, typically, from 100° C. to −40° C., preferably from 80° C. to −40° C., in particular from 50° C. to −40° C.

The compositions typically have a fracture energy, measured according to DIN 11343, of more than 10 J at 0° C., and preferably more than 1.0 J at −40° C. Fracture energies of more than 11.5 J at 0° C. and of more than 1.5 J at −40° C. are particularly preferred.

Hotmelt adhesives based on the composition according to the invention. can also be realized in a special manner. Here, the hydroxyl groups forming in the case of the epoxide adduct A are additionally reacted with polyisocyanate or a polyisocyanate prepolymer. The viscosity is increased thereby, and hot application is required.

A further aspect of the invention relates to novel impact modifiers of the formula (I) which are terminated with epoxide groups and whose detailed constitution and methods of preparation have already been described further above.

It has been found that these impact modifiers of the formula (I) which are terminated with epoxide groups can be added to compositions containing epoxy resin. In addition to the thermally curing 1-component compositions already described, they are also very suitable in the case of 2-component or multicomponent epoxy resin compositions, in particular for those whose second component is an amine hardening agent or a polyamine hardening agent. The impact modifiers of the formula (I) which are terminated with epoxide groups are added to the hardening component, one or more adducts being formed, or preferably are added to that component which contains the epoxy resin. Further, less preferred possibilities are the addition of an impact modifier terminated with epoxide groups directly during the application or the addition as constituent of a third or further component during the application.

The hardening temperature of such 2-component or multicomponent epoxy resin compositions is preferably from 10C to 60° C., in particular from 15° C. to 50° C. Impact modifiers of the formula (I) which are terminated with epoxide groups are particularly suitable as an additive to 2-component epoxy resin adhesives. Here, the increase in the impact resistance is not limited to low temperatures.

These compositions, in particular adhesives, are applied immediately before application by means of a 2-component or multicomponent mixing apparatus to the materials to be brought into contact. Such 2-component or multicomponent adhesives can be used both in automotive construction and in the construction of means of transport (ships, trucks, buses or railway vehicles) or in the construction of consumer goods, such as, for example, washing machines, but also in the building sector, for example as stiffening structural adhesives (inter alia composite materials, etc.).

EXAMPLES

Some examples which further illustrate the invention but are not intended to limit the scope of the invention in any way are to be described below. The raw materials used in the examples are listed in table 1.

General preparation of the epoxide adduct A of the epoxide adduct A premix:

Example for Epoxide Adduct A Premix

A-VM1

123.9 g of a dimeric fatty acid, 1.1 g of triphenylphosphine and 71.3 g of bis(4-hydroxyphenyl) sulfone were reacted with 658 g of a liquid DGEBA epoxy resin having an epoxide content of 5.45 eq/kg for 5 hours at 110° C. in vacuo and with stirring until a constant epoxide concentration of 2.82 eq/kg had been reached. After the end of the reaction, 187.0 g of liquid DGEBA epoxy resin were additionally added to the reaction mixture A.

TABLE 1

| Raw materials used | Supplier |
|---|---|
| Dimerized C18 fatty acid (Pripol 1013) | Uniquema |
| Triphenylphosphine | Fluka AG |
| Bis(4-hydroxyphenyl) sulfone | Fluka AG |
| Bisphenol A diglycidyl ether (=DGEBA) | Vantico |
| Polypropylene glycol diglycidyl ether (ED-506) | Asahi-Denka Kogyo |
| Dicyandiamide (=Dicy) | Degussa |
| Isophorone diisocyanate (=TPDI) | Degussa-Hüls |
| Caprolactam | EMS Chemie |
| N-Butylamine | BASF |
| 4,4'-Diphenylmethylene diisocyanate (=MDI) | Bayer |
| Hexanediol diglycidyl ether | Prummer |
| Alcupol ® D-2021 (difunctional polypropylene glycol, OH equivalent weight = 1000 g/OH equivalent) | Repsol |
| Desmophen 3060 BS (trifunctional polypropylene glycol, OH equivalent weight = 1000 g/OH equivalent) | Bayer |
| PolyTHF 1000 (difunctional polybutylene glycol, OH equivalent weight = 500 g/OH equivalent) | BASF |
| PolyTHF 2000 (difunctional polybutylene glycol, OH equivalent weight = 1000 g/OH equivalent) | BASF |
| Poly bd ® R45 HT (hydroxyl- terminated polybutadiene, OH equivalent weight = about 1200 g/OH equivalent) | Atofina |
| Struktol Polydis ® 3604 (nitrile rubber-modified epoxy resin (epoxide content 3.0 eq/kg) | Schill + Seilacher |

Exemplary Preparation of a Monohydroxyl-Containing Epoxide

Trimethylolpropane glycidyl ether was prepared according to the process in U.S. Pat. No. 5,668,227, example 1, from trimethylolpropane and epichlorohydrin with tetramethylammonium chloride and sodium hydroxide solution. A yellowish product having an epoxide number of 7.5 eq/kg and a hydroxyl group content of 1.8 eq/kg is obtained. From the HPLC-MS spectrum, it is possible to conclude that trimethylolpropane diglycidyl ether is and present in substantial proportions in trimethylolpropane triglycidyl ether.

Different examples of the preparation of the polymer B of the formula (I) are described below.

Example 1 of a Polymer B

B-01

200 g of polyTHF 2000 (OH number 57.5 mg/g KOH) were dried for 30 minutes in vacuo at 100° C. 47.5 g of IPDI and 0.04 g of dibutyltin dilaurate were then added. The reaction was carried out in vacuo at 90° C. to a constant NCO content of 3.6% after 2.5 h (theoretical NCO content: 3.7%). 123.7 g of the trimethylolpropane glycidyl ether described above were then added as monohydroxyl-containing epoxide of the formula (III). Stirring was continued at 90° C. in vacuo until the NCO content had decreased below 0.1% after a further 3 h. After the end of the reaction, 82.5 g of DGEBA were added (1/3 of the mass of the unblocked prepolymer having terminal NCO). A clear product having epoxide content ("final EP content") of 3.15 eq/kg was obtained.

Examples 2-5 of a polymer B

B-02 to B-05

The exemplary polymers B summarized in table 2 and terminated with epoxide groups, referred to as B-02 to B-05, were synthesized on the basis of different polyols or polyol mixtures according to the table below, in the same manner as described for example B-01. The amount of trimethylolpropane glycidyl ether required for terminating the terminal NCO groups was exactly adapted to the NCO content reached after the first synthesis stage. The amount of DGEBA added for dilution was calculated in the case of all prepolymers as 1/3 of the mass of the prepolymer prepared in the first synthesis stage and having terminal NCO.

Example 6 of a Chain-Lengthened Polymer B

B-06

Example 6 B-06 is an example of a polymer B in which the $Y_1$-based polymer is a chain-extended diol.

200 g of polyTHF 1000 (OH number 114 mg/g KOH) were dried for 30 minutes in vacuo at 100° C. 73.5 g of IPDI and 0.04 g of dibutyltin dilaurate were then added. This corresponds to a molar [NCO]/[OH] ratio of 1.6/1 and, as already described, leads to a chain extension of the polymer forming. The reaction was carried out in vacuo at 90° C. to a constant NCO content of 4.9% after 2.5 h (theoretical NCO content: 5.1%). 186.1 g of the trimethylolpropane glycidyl ether described above were added as monohydroxyl-containing epoxide of the formula (III). Stirring was continued at 90° C. in vacuo until the NCO content had decreased below 0.1% after a further 3.5 h. After the end of the reaction, 91.2 g of DGEBA were added (⅓ of the mass of the unblocked prepolymer having terminal NCO). Thus, a clear product having an epoxide content ("final EP content") of 3.50 eq/kg was obtained.

TABLE 2

| Example No. | Polyols used (formula (IV)) | Hydroxyl number (mg/g KOH) | Final EP content (eq/kg) |
|---|---|---|---|
| B-01 | PolyTHF 2000 | 57.5 | 3.15 |
| B-02 | Desmophen 3060 BS | 55.5 | 3.10 |
| B-03 | Desmophen 3060 BS/ poly Bd ® R45 HT (w/w ratio 8/2) | 53.5 | 3.13 |
| B-04 | Alcupol ® D-2021 | 56.0 | 3.15 |
| B-05 | PolyTHF 2000/ poly Bd ® R45 HT (w/w ratio 8/2) | 55.5 | 3.13 |
| B-06 | PolyTHF 1000 | 114 | 3.50 |

Thixotropic Agent C

As an example of a thixotropic agent C based on a urea derivative in a non-diffusing carrier material, one according to Patent Application EP 1 152 019 A1 was prepared in a blocked polyurethane prepolymer using abovementioned raw materials:

Carrier material: Blocked polyurethane prepolymer C1: 600.0 g of a polyetherpolyol (3000 g/mol; OH number 57 mg/g KOH) were reacted in vacuo and with stirring at 90° C. with 140.0 g of IPDI to give the isocyanate-terminated prepolymer until the isocyanate content remained constant. The free isocyanate groups were then blocked with caprolactam (2% excess).

Urea derivative (HSD1) in blocked polyurethane prepolymer:

68.7 g of MDI flakes in 181.3 g of the blocked prepolymer described above were melted under nitrogen and with gentle heating. 40.1 g of N-butylamine, dissolved in 219.9 g of the blocked prepolymer described above were then added dropwise in the course of two hours under nitrogen and with rapid stirring. After the end of the addition of the amine solution, the white paste was stirred for a further 30 minutes. Thus, a white, soft paste which had a free isocyanate content of <0.1% was obtained after cooling (proportion of urea derivative about 20%).

Example Compositions

Various adhesive compositions according to table 3 were prepared as examples.

The highly structural epoxide adhesive Betamate-1493 (commercially available from Dow-Automotive, Freienbach, Switzerland), as examples Ref-01 not according to the invention, and Ref-02 to Ref-04 were used as comparison reference to the example compositions according to the invention.

After application to electrolytically galvanized steel (eloZn), the adhesives were hardened at 50° C. in the course of 30 minutes in an oven at 180° C. All tests were effected only after cooling of the adhesive to room temperature.

Test Methods:

Tensile shear strength (TSS) (DIN EN 1465)

The test specimens were produced with electrolytically galvanized steel (elozn) having the dimensions 100×25×0.8 mm; the adhesion area was 25×10 mm, with a layer thickness of 0.3 mm. Hardening was effected for 30 min at 180° C. The traction rate was 10 mm/min.

Dynamic Resistance to Cleavage (ISO 11343)

The test specimens were produced with electrolytically galvanized steel (elozn) having the dimensions 90×25×0.8 mm; the adhesion area was 25×30 mm with a layer thickness of 0.3 mm. Hardening was effected for 30 min at 180° C. The traction rate was 2 m/s. The area under the curve (from 25% to 90%, according to DIN 11343) is stated as the fracture energy in Joules.

TABLE 3

Compositions and results.

| | Ref-01 | Ref-02 | Ref-03 | Ref-04 | Z-01 | Z-02 | Z-03 | Z-04 | Z-05 | Z-06 |
|---|---|---|---|---|---|---|---|---|---|---|
| A-VM1 [g] | | 55.6 | 55.6 | 55.6 | 55.6 | 55.6 | 55.6 | 55.6 | 55.6 | 55.6 |
| Additive DGEBA [g] | | | | 3.3 | | | | | | |
| Polydis ® 3604 [g] | | | 18.0 | | | | | | | |
| B-01 [g] | | | | | 18.0 | | | | | |
| B-02 [g] | | | | | | 18.0 | | | | |
| B-03 [g] | | | | | | | 18.0 | | | |
| B-04 [g] | | | | | | | | 18.0 | | |
| B-05 [g] | | | | | | | | | 18.0 | |
| B-06 [g] | | | | | | | | | | 18.0 |
| C [g] | | 21.0 | 21.0 | 21.0 | 21.0 | 21.0 | 21.0 | 21.0 | 21.0 | 21.0 |
| Addition of blocked pre-polymer (C1) [g] | | | 14.7 | | | | | | | |
| Dicyandiamide (D) [g] | | 3.4 | 3.9 | 3.4 | 4.0 | 4.0 | 4.0 | 3.9 | 4.0 | 4.0 |
| Filler mixture (E) [g] | | 22.0 | 22.0 | 22.0 | 22.0 | 22.0 | 22.0 | 22.0 | 22.0 | 22.0 |
| Hexanediol diglycidyl ether (F) [g] | | | 1.5 | 1.5 | 1.5 | 1.5 | 1.5 | 1.5 | 1.5 | 1.5 |
| ED-506 (F) [g] | | 2.4 | 2.4 | 2.4 | 2.4 | 2.4 | 2.4 | 2.4 | 2.4 | 2.4 |
| TSS [MPa] | 19.9 | 21.2 | 20.5 | 15.8 | 19.8 | 18.8 | 19.2 | 19.6 | 19.1 | 20.7 |
| FE[1] at 50° C. [J] | 18.0 | 14.0 | 12.3 | 8.8 | 14.3 | 12.9 | 13.6 | 14.9 | 13.6 | 14.5 |
| FE[1] at 23° C. [J] | 17.8 | 11.2 | 9.6 | 7.4 | 14.4 | 13.0 | 13.2 | 13.2 | 14.0 | 14.7 |
| FE[1] at 0° C. [J] | 16.2 | 5.8 | 6.3 | 6.4 | 14.0 | 12.4 | 12.9 | 12.0 | 12.9 | 13.5 |

TABLE 3-continued

Compositions and results.

| | Ref-01 | Ref-02 | Ref-03 | Ref-04 | Z-01 | Z-02 | Z-03 | Z-04 | Z-05 | Z-06 |
|---|---|---|---|---|---|---|---|---|---|---|
| FE[1] at −20° C. [J] | 4.2 | 2.4 | 2.1 | 2.1 | 11.9 | 10.5 | 9.4 | 7.4 | 9.8 | 9.2 |
| FE[1] at −40° C. [J] | 0.5 | 0.4 | 0.2 | 0.4 | 6.0 | 2.6 | 4.1 | 1.6 | 4.0 | 3.5 |

[1]FE = Fracture energy

Results

The results of the adhesive formulations in table 3 show that the combination of high strength and high impact resistance can be achieved with the compositions according to the invention, both at room temperature and at low temperatures down to −40° C.

Reference example Ref-01 exhibits good impact resistances at temperatures above 0° C. but has substantially lower values in comparison with the adhesives according to the invention at low temperatures, i.e. below 0° C.

Reference example Ref-02 differs from the examples according to the invention substantially through the absence of the impact modifier of the formula (I) which is terminated with epoxide groups. The results show that the composition has impact resistances comparable to the compositions according to the invention at 50° C. but is considerably poorer than these at lower temperatures, in particular 0C and lower.

Reference example Ref-03 comprises an added commercially available polybutadiene/acrylonitrile copolymer terminated with epoxide groups. However, the results show that the impact resistances below 50° C. are substantially poorer than those of the compositions according to the invention.

Reference example Ref-04 differs from Ref-02 substantially in that it contains twice as much blocked polyurethane prepolymer of the thixotropic agent. However, the results show that, in spite of its flexibilizing character, this is by no means required for the impact resistances.

The compositions Z-01 to Z-06 according to the invention all have good fracture energies. These values are particularly advantageous at temperatures of from 0° C. to −40° C.

The invention claimed is:

1. An impact modifier terminated by epoxide groups of the formula (I)

$$Y_1 \left[ X_1 \underset{O}{\overset{H}{\underset{\|}{C}}} \underset{}{\overset{H}{N}} Y_2 \left[ \underset{O}{\overset{H}{\underset{\|}{C}}} \underset{}{\overset{}{N}} \underset{}{\overset{}{C}} - O - Y_3 \left[ \overset{O}{\triangle} \right]_q \right]_m \right]_n \quad (I)$$

wherein:
 $X_1$ is O;
 $Y_1$ is a polyoxybutylene or a polybutadiene;
 $Y_2$ is a divalent radical of aliphatic, cycloaliphatic, aromatic or araliphatic diisocyanates after removal of the isocyanate groups or is a trivalent radical of trimers or biurets of aliphatic, cycloaliphatic, aromatic or araliphatic diisocyanates after removal of the isocyanate groups;
 $Y_3$ is a radical of an aliphatic, cycloaliphatic, aromatic or araliphatic epoxide containing a primary or secondary hydroxyl group after removal of the hydroxide and epoxide groups;
 q is 2 or 3;
 m is 1 or 2;
 n is 2, 3 or 4; and
 the polymer on which $Y_1$ in formula (I) is based is a diol or triol having an OH equivalent weight of 600-6000 g/mol.

2. A one-component thermally hardening epoxy resin adhesive comprising the impact modifier terminated by epoxide groups as claimed in claim 1.

3. A two-component epoxy resin adhesive comprising the impact modifier terminated by epoxide groups as claimed in claim 1.

4. The impact modifier terminated by epoxide groups according to claim 1, wherein $Y_1$ is a polyoxybutylene.

5. A composition comprising:
 at least one epoxide adduct A having on average more than one epoxide group per molecule;
 at least one polymer B of the formula (I)

$$Y_1 \left[ X_1 \underset{O}{\overset{H}{\underset{\|}{C}}} \underset{}{\overset{H}{N}} Y_2 \left[ \underset{O}{\overset{H}{\underset{\|}{C}}} \underset{}{\overset{}{N}} \underset{}{\overset{}{C}} - O - Y_3 \left[ \overset{O}{\triangle} \right]_q \right]_m \right]_n \quad (I)$$

wherein:
 $X_1$ is O;
 $Y_1$ is a polyoxybutylene polybutadiene;
 $Y_2$ is a divalent radical of aliphatic, cycloaliphatic, aromatic or araliphatic diisocyanates after removal of the isocyanate groups or is a trivalent radical of trimers or biurets of aliphatic, cycloaliphatic, aromatic or araliphatic diisocyanates after removal of the isocyanate groups;
 $Y_3$ is a radical of an aliphatic, cycloaliphatic, aromatic or araliphatic epoxide containing a primary or secondary hydroxyl group after removal of the hydroxide and epoxide groups;
 q is 2 or 3;
 m is 1 or 2; and
 n is 2, 3 or 4;
 wherein the polymer on which $Y_1$ in formula (I) is based is a diol or triol having an OH equivalent weight of 600-6000 g/mol; and
 at least one thixotropic agent C based on a urea derivative in a non-diffusing carrier material; and
 at least one hardening agent D for epoxy resins which is activated by elevated temperature.

6. The composition as claimed in claim 5, wherein the epoxide adduct A is obtainable from a reaction of at least one dicarboxylic acid and at least one diglycidyl ether; or a reaction of at least one bis(aminophenyl) sulfone isomer or a reaction of at least one aromatic alcohol and at least one diglycidyl ether.

7. The composition as claimed in claim 6, wherein the dicarboxylic acid is a dimeric fatty acid and the diglycidyl ether is selected from the group consisting of bisphenol A diglycidyl ether, bisphenol F diglycidyl ether, and bisphenol A/F diglycidyl ether.

8. The composition as claimed in claim 6, wherein the aromatic alcohol is selected from the group consisting of 2,2-bis(4-hydroxyphenyl)propane, bis(4-hydroxyphenyl) methane, bis(4-hydroxyphenyl)sulfone, hydroquinone, resorcinol, pyrocatechol, naphthohydroquinone, napthoresorcinol, dihydroxynaphthalene, dihydroxyanthraquinone, dihydroxybiphenyl, 3,3-bis(p-hydroxyphenyl)phthalides, 5,5-bis(4-hydroxyphenyl) hexahydro-4,7-methanoindane and all isomers of the abovementioned compounds and the diglycidyl ether is bisphenol A diglycidyl ether, bisphenol F diglycidyl ether and bisphenol A/F diglycidyl ether.

9. The composition as claimed in claim 5, wherein the polymer B is resilient.

10. The composition as claimed in claim 5, wherein the polymer B is soluble or dispersible in epoxy resins.

11. The composition as claimed in claim 5, wherein, in formula (I), n is 2 or 3.

12. The composition as claimed in claim 5, wherein m is 1 and the diisocyanate on which $Y_2$ in formula (I) is based is HDI, IPDI, MDI or TDI.

13. The composition as claimed in claim 5, wherein the proportion by weight of all polymers B of the formula (I) is from 5 to 40% by weight based on a total weight of the composition.

14. The composition as claimed in claim 5, wherein the carrier material of the thixotropic agent C is a blocked polyurethane prepolymer.

15. The composition as claimed in claim 5, wherein the urea derivative in the thixotropic agent C is a product of a reaction of an aromatic monomeric diisocyanate with an aliphatic amine compound.

16. The composition as claimed in claim 5, wherein a proportion by weight of the thixotropic agent C is 5-40% by weight based on a total weight of the composition.

17. The composition as claimed in claim 5, wherein a proportion of the urea derivative is 5-50% by weight based on a weight of the thixotropic agent C.

18. The composition as claimed in claim 5, wherein the hardening agent D is a latent hardening agent selected from the group consisting of dicyandiamide, guanamines, guanidines and aminoguanidines.

19. The composition as claimed in claim 5, wherein a total proportion of the hardening agent D is 1-10% by weight based on a total weight of the composition.

20. The composition as claimed in claim 5, wherein at least one filler E is additionally present.

21. The composition as claimed in claim 20, wherein a total proportion of the filler E is 5-30% by weight based on a total weight of the total composition.

22. The composition as claimed in claim 5, wherein at least one reactive diluent F carrying epoxide groups is additionally present.

23. The composition as claimed in claim 5, wherein, after hardening, the composition has a low-temperature fracture energy, measured according to DIN 11343, of more than 10 J at 0° C.

24. A one-component adhesive comprising the composition as claimed in claim 1.

25. The one-component adhesive as claimed in claim 24, wherein the adhesive bonds heat-stable materials.

26. The one-component adhesive as claimed in claim 24, wherein the adhesive is an automotive body-shell construction adhesive.

27. A method for the adhesive bonding of heat-stable materials, wherein the heat-stable materials are brought into contact with a composition as claimed in claim 5 and comprises a hardening step at a temperature of 100-220° C.

28. The method of claim 27, wherein the materials being brought into contact with the composition comprise:
at least one epoxide adduct A having on average more than one epoxide group per molecule;
at least one polymer B of the formula (I)

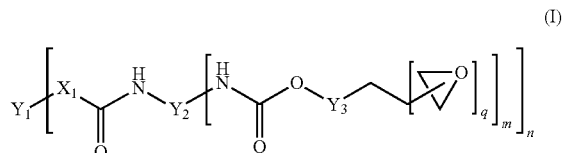

wherein:
$X_1$ is O;
$Y_1$ is a polyoxybutylene polybutadiene;
$Y_2$ is a divalent radical of aliphatic, cycloaliphatic, aromatic or araliphatic diisocyanates after removal of the isocyanate groups;
or is a trivalent radical of trimers or biurets of aliphatic, cycloaliphatic, aromatic or araliphatic diisocyanates after removal of the isocyanate groups;
$Y_3$ is a radical of an aliphatic, cycloaliphatic, aromatic or araliphatic epoxide containing a primary or secondary hydroxyl group after removal of the hydroxide and epoxide groups;
q is 2 or 3;
m is 1 or 2; and
n is 2, 3 or 4;
wherein the polymer on which $Y_1$ in formula (I) is based is a diol or triol having an OH equivalent weight of 600-6000 g/mol; and
at least one thixotropic agent C based on a urea derivative in a non-diffusing carrier material; and
at least one hardening agent D for epoxy resins which is activated by elevated temperature and the adhesively bonded materials being used at a temperature of from 100° C. to −40° C.

* * * * *